(12) United States Patent
Britton et al.

(10) Patent No.: US 8,268,901 B2
(45) Date of Patent: Sep. 18, 2012

(54) COATED PARTICULATE EXPANDABLE POLYLACTIC ACID

(75) Inventors: Robin Nicholas Britton, Calton (GB); Franciscus Adrianus Hendrikus Cornelis Van Doormalen, Someren (NL); Jan Noordegraaf, Wijchen (NL); Karin Molenveld, Wageningen (NL); Geraldus Gerardus Johannes Schennink, Wehl (NL)

(73) Assignee: Synbra Technology B.V., Etten-Leur (NL)

( * ) Notice: Subject to any disclaimer, the term of this patent is extended or adjusted under 35 U.S.C. 154(b) by 281 days.

(21) Appl. No.: 12/595,719

(22) PCT Filed: Apr. 21, 2008

(86) PCT No.: PCT/NL2008/000109
§ 371 (c)(1),
(2), (4) Date: Dec. 1, 2009

(87) PCT Pub. No.: WO2008/130226
PCT Pub. Date: Oct. 30, 2008

(65) Prior Publication Data
US 2010/0087556 A1     Apr. 8, 2010

(30) Foreign Application Priority Data
Apr. 19, 2007   (NL) .................................... 1033719

(51) Int. Cl.
*C08J 9/22*      (2006.01)
*C08G 63/00*     (2006.01)

(52) U.S. Cl. .............. 521/56; 521/57; 521/58; 521/182; 521/189

(58) Field of Classification Search ................... 521/56, 521/57, 58, 182, 189
See application file for complete search history.

(56) References Cited

U.S. PATENT DOCUMENTS

| | | | | |
|---|---|---|---|---|
| 3,461,088 A | * | 8/1969 | Grohmann et al. | 521/57 |
| 3,480,570 A | * | 11/1969 | Stephenson et al. | 521/57 |
| 4,020,133 A | * | 4/1977 | Altares, Jr. | 264/53 |
| 4,251,400 A | * | 2/1981 | Columbus | 524/24 |
| 6,184,289 B1 | * | 2/2001 | Teranishi et al. | 525/95 |
| 6,576,704 B2 | * | 6/2003 | Nagao et al. | 525/57 |
| 2005/0266244 A1 | * | 12/2005 | Park | 428/403 |
| 2006/0167122 A1 | | 7/2006 | Haraguchi et al. | 521/60 |

FOREIGN PATENT DOCUMENTS

| | | |
|---|---|---|
| GB | 1289466 | 9/1972 |
| JP | 2001 098104 | 4/2001 |
| JP | 2005 068306 | 3/2005 |

* cited by examiner

*Primary Examiner* — Irina S Zemel
(74) *Attorney, Agent, or Firm* — Roberts & Roberts, LLP

(57) ABSTRACT

The present invention relates to a particulate expandable polylactic acid which functions as a starting material for producing foamed moulded products. The present particulate expandable polylactic acid is provided with a coating so as to improve the fusion properties. The present invention also relates to a method for producing a particulate expandable polylactic acid as well as to a method for producing a foamed moulded product and to the moulded product obtained thereby.

20 Claims, No Drawings

COATED PARTICULATE EXPANDABLE POLYLACTIC ACID

The present invention relates to a particulate expandable polylactic acid. The present invention further relates to a method for producing a particulate expandable polylactic acid as well as to a method for producing a foamed moulded product and to a foamed moulded product obtained thereby.

Particulate expandable polylactic acid is known from US 2006/0167122, and consists of a base resin comprising polylactic acid, a polyolefin resin and a blowing agent. A drawback of said particulate expandable polylactic acid is that insufficient fusion between the individual particles of the polylactic acid occurs during the formation of foamed moulded products based on said expandable polylactic acid. To obtain a good fusion yet, a high pressure and a high temperature are required. However, because polylactic acid has a limited thermal stability, it is not possible to use such a high temperature and pressure without this resulting in degradation of the polylactic acid or collapse of the foam. Consequently, this leads to foamed moulded products not having the required mechanical properties, which is undesirable in those cases in which the foamed moulded product is used for constructional purposes.

JP 2001-098104 relates to biodegradable foam particles based on polylactic acid, which particles are mixed with higher fatty acids or metal salts, esters or amides thereof.

JP 2005-068306 relates to particles of a polylactic acid-based resin composition for use in packaging for foodstuffs.

U.S. Pat. No. 4,020,133 relates to an anti-lumping agent for polystyrene beads.

Accordingly, there is a need for improvement of the fusion of particulate expandable polylactic acid into foamed moulded products.

Consequently it is an object of the present invention to provide a particulate polylactic acid which, when used to form foamed moulded products, leads to improved fusion.

In addition to that it is an object of the present invention to provide a method for forming a foamed moulded product, which method will lead to a foamed moulded product exhibiting a good fusion between the individual particles.

It is also an object of the present invention to provide a method which leads to a foamed moulded product having good mechanical properties.

It is also an object of the present invention to provide a foamed moulded product having good mechanical properties.

In addition to that it is an object of the present invention to provide a foamed moulded product which is to a large extent or even fully biodegradable. The term "biodegradable" as used in this context is understood to mean that the degradation of the product complies with the current European Standard for compostability, viz. EN-13432:2000.

One or more of these objects are accomplished by the present invention in that it provides a method according to the preamble, which is characterised in that the particulate polylactic acid is provided with a coating.

At present, foamed moulded products are in particular made from polymers obtained from petrochemical sources, such as polystyrene.

The past few years, however, people have increasingly come to realise that said petrochemical sources are not inexhaustible and that consequently alternatives, such as renewable raw materials, need to be found.

Furthermore, there is the increasing problem of increasing volumes of waste. Consequently, much research is aimed at finding biodegradable products, so as to reduce the mountain of waste.

Accordingly, there is a need for biodegradable foamed moulded products based on renewable raw materials.

The last few years this has resulted in an enormously increased interest in polylactic acid (PLA) as a renewable biodegradable material for a wide range of applications. Polylactic acid is a collective term used for polymers based on lactic acid monomers, in which the structure of the polylactic acid may vary according to the composition, from completely amorphous to semi-crystalline or crystalline. Polylactic acid can be produced from milk products or for example maize.

Lactic acid is the monomer of which polylactic acid is composed, and this monomer occurs in two stereoisomers, notably L-lactic acid and D-lactic acid. Thus polylactic acid comprises a certain proportion of L-lactic-acid monomers and a certain proportion of D-lactic-acid monomers. The ratio between the L- and D-lactic-acid monomers in polylactic acid determines its properties. This is also known as a D value or D-content, which represents the percentage of D-lactic-acid monomers in the polylactic acid. Polylactic acid that is at present commercially available has an L:D ratio of between 100:0 and 75:25; in other words, a D-content of between 0 and 25%, or between 0 and 0.25. When polylactic acid contains more than approximately 12% D-lactic acid it can no longer crystallise, and is hence completely amorphous. When the D-content is maximally 5%, it is referred to as semi-crystalline polylactic acid. The crystallinity of the polylactic acid can be determined by means of differential scanning calorimetry (DSC). The term "semi-crystalline" is understood to mean that the polymer is capable of crystallising and also melting. Thus it can be stated that the lower the D-content, the higher the crystallinity of the polylactic acid will be. The D-content is usually determined by using a known method, such as a so-called R-lactate determination using gas-liquid chromatography (GLC) after complete hydrolysis of the polymer. Another standard method is determination via optical rotation (measured in chloroform using a Jasco DIP-140 polarimeter at a wavelength of 589 nm).

The D-content of the polylactic acid according to the present invention is preferably between 0 and 15%, in particular between 0.1 and 10%, more in particular between 0.5 and 5% and especially between 1 and 4.7%. The D-content is in particular less than 5 wt. %. The ratio between amorphous and semi-crystalline polylactic acid according to the present invention is preferably between 0 and 90% amorphous, preferably between 10 and 75%, in particular between 30 and 60%.

In producing foamed moulded products based on particulate expandable polylactic acid it is of the greatest importance that the fusion between the individual particles is sufficient to obtain a product that will not disintegrate into the individual particles under a slight load. The process conditions are also very important. In view of the limited thermal stability of polylactic acid in comparison with petrochemical polymers it is very important that good fusion is realised even under mild process conditions.

The present inventors have found that when particulate expandable polylactic acid is coated, it is indeed possible to realise good fusion under mild process conditions.

It should be noted in this connection that the foamed moulded product can be obtained in two different ways. Either the particulate expandable polylactic acid is coated and subsequently foamed and formed into a foamed moulded product in one step, or the particulate expandable polylactic acid is first prefoamed, then coated and subsequently formed into the foamed moulded product. Thus the coating can be directly applied to the polylactic acid particles or to the already prefoamed polylactic acid particles. After the application of the coating, a blowing agent must be added to the particles to make them expandable (again).

In the situation in which the coating is applied to already prefoamed particles of polylactic acid, an additional advantage is achieved, viz. that the diffusion of blowing agents from the prefoamed particles decreases, so that a more reliable and more robust process is obtained.

The use of a coating makes it possible to produce foamed moulded products exhibiting improved fusion between the individual particles. This makes it possible to form moulded products having a lower density and a comparable or improved strength and excellent thermal stability.

The present invention and its advantages will now be further elucidated with reference to a number of preferred embodiments.

It is preferable for the coating to be present in an amount of between 0.5 wt. % and 15 wt. %, based on the weight of the particulate polylactic acid. The present inventors have found that this amount makes it possible to realise a good compromise between a good fusion between the particles on the one hand and good foam properties on the other hand. If less coating than 0.5 wt. % is used, fusion will be insufficient. If more coating than 15 wt. % is used, the foam properties will be less good.

A particularly advantageous amount of coating is an amount ranging between 2 wt. % and 10 wt. %, because this leads to an optimum compromise.

As already discussed before, polylactic acid is biodegradable. Accordingly it is preferable for the coating to be biodegradable as well, so as so obtain a foamed moulded product which is fully biodegradable.

The coating is preferably selected from the group consisting of polyvinyl acetate, polyvinyl-acetate-based polymer, polyvinyl alcohol, polycaprolactone, polyester, polyester amide, protein-based material, polysaccharide, natural wax or grease and acrylate or one or more combinations thereof. The coating may also be amorphous polylactic acid or a combination hereof with the other coatings.

Examples of a coating based on polyvinyl acetate and polyvinyl-acetate-based polymers are Vinnex and Vinnapas polymers supplied by Wacker Chemie.

The coating based on the protein-based material is preferably selected from the group consisting of gelatin, collagen, casein and soy protein and one or more combinations thereof.

The coating based on polysaccharide is preferably selected from the group consisting of cellulose, cellulose derivative, starch, starch derivative, chitosan, alginate, pectin, carrageenan, Arabic gum and gellan gum.

The coating based on natural wax or grease is preferably selected from the group consisting of beeswax, carnauba wax, candelilla wax, paraffin wax, polyethylene wax, fatty acid, monoglyceride and shellac.

The coating may optionally also comprise a plasticiser, preferably selected from the group comprising glycerol and urea. The plasticiser may also be sorbitol.

As an alternative to biodegradable coatings, it is also possible to use non-biodegradable coatings, such as an acrylate coating, for example Neocryl supplied by DSM.

Preferably, the coating is selected from polyvinyl acetate, casein, ethyl cellulose, polycaprolactone, amorphous polylactic acid and one or more combinations thereof.

The fusion properties are to a large degree determined by the melting point of these coatings. The melting point of the coating can be adjusted by the selection of the material and the possible addition of a plasticiser and can be selected by the skilled person in dependence on the desired application.

The polylactic acid according to the present invention can preferably be selected from the group consisting of semi-crystalline polylactic acid, amorphous polylactic acid and a mixture thereof. It is also possible to mix the polylactic acid with other (biodegradable) polymers. Examples of this are a copolyester of butane diol, adipic acid and terephthalic acid (brand name Ecoflex supplied by BASF) a mixture of starch and water and starch.

It is also possible to mix the polylactic acid with polystyrene, possibly in expandable form, preferably in an amount of 0.1-35 wt. %, preferably 1-10 wt. % polystyrene.

Preferably, the polylactic acid is present in the total polymer composition in an amount of at least 50 wt. %, in particular at least 75 wt. % and especially at least 90 wt. % or even at least 99 wt. %. After all, as a result of this the advantageous properties of polylactic acid optimally come to the fore in the moulded product that is ultimately obtained. Thus, the larger part of the polymer that is used is polylactic acid at all times, hence the use of the term "particulate polylactic acid" in the present description and claims, even though another polymer may be present.

Amorphous polylactic acid has a glass transition temperature (Tg) of about 55° C. Such a low glass transition temperature leads to material having a highly restricted thermal stability. The thermal stability of semi-crystalline polylactic acid is better, as it has a higher glass transition temperature, viz. 90° C. (the height of the temperature is a function of the crystallinity). It is therefore preferable to use a mixture of amorphous and semi-crystalline polylactic acid.

The type of polylactic acid selected determines the hardness and thermal stability of the foamed moulded product that is ultimately obtained.

In a preferred embodiment of the present invention, the polylactic acid comprises a chain extender, preferably selected from the group consisting of polyepoxides and diepoxides (Joncryl 4368C supplied by BASF), diisocyantates, oxazines and oxazolines, cyclic dianhydrides (for example PMDA), peroxides (for example Trigonox types supplied by Akzo Nobel) and the like.

To increase the melt strength of the polylactic acid, such a chain extender may be added. An example of such a chain extender is Joncryl 4368C supplied by BASF. Zinc stearate can optionally be added as a catalyst.

In another embodiment of the present invention, the polylactic acid also comprises a nucleating agent or foam-nucleating agent, preferably selected from the group consisting of polyolefin wax, such as polyethylene wax or polypropylene wax, or talcum or nano clay. The foam quality is improved by the addition of such a nucleating agent. An example of this is Polywax P3000 supplied by Baker Hughes Corp.

In yet another preferred embodiment of the present invention, the polylactic acid also comprises a lubricant, for example selected from the group consisting of zinc stearate or other metal salts of stearates. Said lubricant functions as an external lubricant. If zinc stearate is selected, it can also act as a catalyst of the chain extender.

The particle size of the particulate extruded product preferably ranges between 0.5 mm and 5 mm. A particle size of less than 0.5 mm is very difficult to obtain without loss of the desired properties, and a particle size of more than 5 mm leads to less advantageous foam properties on account of the reduced ratio between the area and volume of the particle.

The particle size in particular ranges between 0.5 mm and 1.5 mm, with a view to obtaining optimum foam properties.

The bulk density (tapped) of non-prefoamed polylactic acid particles according to the present invention preferably ranges between 700 g/l and 1000 g/l.

The density of prefoamed polylactic acid particles preferably ranges between 10 g/l and 100 g/l, in particular between 15 g/l and 60 g/l. The present inventors have found that this leads to good results in particular in the forming of the foamed moulded product that is ultimately obtained. They have also found that this leads to an optimum result in the use of the coating and the fusion improved for that purpose.

The present invention also relates to a method for producing a particulate expandable polylactic acid as described in the foregoing, which method comprises the steps of:

a) providing a polylactic acid;
b) forming the polylactic acid obtained in step a) into particles;
c) coating the particulate polylactic acid obtained in step b);
d) impregnating the coated particulate polylactic acid obtained in step c) with a blowing agent to obtain a particulate, expandable polylactic acid.

By using this method, the particulate polylactic acid according to the present invention is obtained in an optimum manner.

The coating can be applied, for example, through immersion or atomisation, possibly in a fluidized bed reactor.

Step b) can be carried out by using an extruder, for example a twin-screw extruder. The polylactic acid or the mixture of polylactic acid and one or more other biodegradable polymers comprising one or more of chain extender, nucleating agent and lubricant can be processed to form particles therewith. The extruder may to that end be fitted with a die with a so-called underwater granulator.

Examples of blowing agents that may be used are $CO_2$, MTBE, nitrogen, air, (iso)pentane, propane, butane and the like or one or more combinations hereof. If prefoaming is carried out, the blowing agent can for that purpose be injected into the polylactic acid melt before or during step b) or the particles can be impregnated with blowing agent afterwards.

After the application of the coating, the particles must be re-impregnated with blowing agent at all times.

As already discussed before, it is also possible to prefoam the particles first before applying the coating. This can be done by using a preferred embodiment of the aforesaid method, wherein step b) comprises two substeps, viz.:

b1) forming the polylactic acid obtained in step a) into expandable particles;
b2) prefoaming the particulate expandable polylactic acid obtained in step b1) to a density of 10-100 g/l to obtain prefoamed particulate polylactic acid;
and wherein step c) comprises the coating of the prefoamed particulate polylactic acid obtained in step b2).

Step b1) can be carried out in various ways. Two of said ways will be elucidated hereinafter.

According to the first way, the polylactic acid is formed into particles, for example by means of an extrusion process, which particles are subsequently made expandable by impregnating them with a blowing agent.

According to the second way, the polylactic acid is mixed with a blowing agent, which mixture is subsequently directly formed into expandable particles, for example by means of an extrusion process.

The present invention also relates to a method for producing a foamed moulded product, which method comprises the steps of:

i) providing particulate expandable polylactic acid according to the invention;
ii) bringing the particulate expandable polylactic acid in step i) under specific temperature and pressure conditions so that a foamed moulded product is obtained.

The properties of the final moulded product, such as density, flexibility and thermal stability depend, among other things, on the type of polylactic acid, the type and amount of blowing agent and the process conditions.

In a preferred embodiment of the present method, the particulate polylactic acid is contacted with air or steam having a temperature of 60-160° C. in step ii). The present inventors have found that at these temperatures, and in particular at temperatures ranging between 60° C. and 100° C., a good compromise between good fusion, which becomes better as the temperature rises, and good mechanical properties of polylactic acid, which deteriorate due to thermal instability as the temperature rises.

In another preferred embodiment, a pressure of 0.1-2.0 bar is used in step ii).

The present invention also relates to a foamed moulded product obtained by using the present method.

The density of the final foamed moulded product preferably ranges between 10 g/l and 100 g/l. When a prefoamed particulate polylactic acid is thus used, hardly any foaming will occur, if at all, in the step of forming the final moulded product. In such a case there will only be fusion between the particles.

There is of course a possibility that both fusion and foaming will occur during the step of forming the foamed moulded product, even if a prefoamed polylactic acid is used.

The present invention will now be further elucidated with reference to the following non-limiting examples.

EXAMPLES

Example 1

Including a Prefoaming Step and a Coating Step

A mixture of one part each of two types of polylactic acid, viz. firstly a semi-crystalline polylactic acid (brand name: HM1010 supplied by Tate & Lyle) and secondly an amorphous polylactic acid (brand name: Natureworks 4060 supplied by Cargill Dow) is prepared. Furthermore, 0.6 wt. % of a chain extender (brand name: Joncryl 4368C supplied by BASF), 0.4 wt. % of a nucleating agent based on a polyethylene wax (brand name: Polywax P3000 supplied by Baker Hughes Corp) and 0.2 wt. % of a lubricant, being zinc stearate, which also functions as a catalyst for the chain extender, are added to said 1:1 mixture.

The mixture is added to a twin-screw compounding extruder (type number: Berstorff ZE75 36xD UTX). From the extruder a homogeneous melt is transporter to the extruder die (type number: Gala A6 underwater granulator) via a so-called melt pump. Said die has 192 holes, each having a diameter of 0.7 mm, and the particulate polylactic acid being produced has a particle diameter of 1.1-1.5 mm.

The particulate polylactic acid is subsequently impregnated with a blowing agent, viz. $CO_2$, in a pressure vessel at a pressure of 20 bar for 5 hours. After impregnation, the particulate polylactic acid contains about 5 wt. % $CO_2$.

The particulate polylactic acid is subsequently prefoamed or pre-expanded, using hot air (at a temperature of about 90° C.) for 1 minute. The prefoamed particulate polylactic acid has a density of about 60 g/l.

The prefoamed particulate polylactic acid is then coated in a fluidized bed reactor (brand name: Glatt), which coating makes up 4.9 wt. % of the total amount of particulate polylactic acid after coating. The coating is applied by means of a 50 wt. % solution of polyvinyl acetate (brand name: Vinnex 2501 supplied by Wacker Chemie) in water. After coating, the prefoamed, coated particulate polylactic acid is re-impregnated with a blowing agent, viz. $CO_2$, by being treated in a pressure vessel at 20 bar for 20 minutes. The re-impregnated particulate polylactic acid contains about 7 wt. % $CO_2$.

Then the re-impregnated particulate polylactic acid is supplied to an industrial production unit for foamed moulded products, in which further expansion and fusion of the prefoamed particulate polylactic acid takes place, using steam, to obtain a foamed moulded product having a density of 60 g/l.

The fusion of the particulate polylactic acid as well as the mechanical strength of the obtained moulded product is evaluated and the results are shown in Table 1.

Example 2

No Prefoaming Step, But Including a Coating Step

A particulate polylactic acid as described in Example 1 is prepared. However, after the extrusion step the particulate polylactic acid is neither impregnated with a blowing agent nor prefoamed.

The particulate polylactic acid is then coated in a fluidized bed reactor (brand name: Glatt), which coating makes up 4.9 wt. % of the total amount of particulate polylactic acid after coating. The coating is applied by means of a 50 wt. % solution of polyvinyl acetate (brand name: Vinnex 2501 supplied by Wacker Chemie) in water.

After coating, the coated particulate polylactic acid is impregnated with a blowing agent, viz. $CO_2$, by being treated in a pressure vessel at 20 bar for 20 minutes. The impregnated particulate polylactic acid contains about 7 wt. % $CO_2$.

Then the impregnated particulate polylactic acid is supplied to an industrial production unit for foamed moulded products, in which expansion and fusion of the prefoamed particulate polylactic acid takes place, using steam, to obtain a foamed moulded product having a density of 60 g/l.

The fusion of the particulate polylactic acid as well as the mechanical strength of the obtained moulded product is evaluated and the results are shown in Table 1.

Example 3

No Prefoaming Step, But Including a Coating Step

The method of Example 2 is repeated, and the impregnated particulate polylactic acid is foamed in a small mould (tea ball), using steam, with expansion and fusion into a foamed moulded product taking place. The fusion of said foamed moulded product is manually determined—by squeezing the moulded product—and assigned a score from 1-10, 10 indicating excellent fusion and 1 indicating no fusion. The coatings used are varied as shown in Table 2, which table also shows the score for the fusion. The coatings are: Vinnex 2501, Vinnex 2504 and Vinnex 2510 and Vinnex 2502 supplied by Wacker Chemie, carboxymethyl cellulose including 25% sorbitol, gelatin (including sorbitol plasticiser), casein (including glycerol plasticiser), polyvinyl alcohol type 3-98 and type 3-88, (including glycerol plasticiser), ethyl cellulose (including glycerol plasticiser), CAPA (polycaprolactone from Solvay), amorphous polylactic acid, not including a coating but including glycerol monostearate and glycerol tristearate.

Example 4

Including a Prefoaming Step and a Coating Step

Semi-crystalline polylactic acid (Natureworks type 4042) having a D-content of 4.5% is metered to a Berstorff ZE40*38D twin screw compounding extruder. From the extruder, a homogeneous melt is transported to a Gala underwater granulator provided with 64 holes having a diameter of 0.7 mm and the particles (microbeads) thus produced having a diameter of 1.1-1.5 mm. The particles are impregnated with $CO_2$ in a pressure vessel at a pressure of 20 bar for 16 hours, after which impregnation the particles contain about 8% $CO_2$. The particles are then prefoamed by means of hot air (110° C.) for 1 minute. The prefoamed particles have a density of about 45 g/l. The prefoamed particles are coated with 4.9% Vinnex 2501 from Wacker Chemie and subsequently reimpregnated with $CO_2$ in a pressure vessel at 10 bar for 10 minutes. The reimpregnated particles contain about 3.5% $CO_2$. The reimpregnated particles are metered to an industrial production unit for foamed moulded products, in which fusion of the prefoamed particles takes place, using steam.

Example 5

Including a Prefoaming Step and a Coating Step

A mixture comprising 50% type 3051 and 50% type 4046 (both Natureworks) having a D-content of 4.7% is metered to a Berstorff ZE40*38D twin screw compounding extruder. From the extruder, a homogeneous melt is transported to a Gala underwater granulator provided with 64 holes having a diameter of 0.7 mm and the particles (microbeads) thus produced having a diameter of 1.1 to 1.5 mm. The produced particles are impregnated with $CO_2$ in a pressure vessel at a pressure of 20 bar for 16 hours, after which impregnation the particles contain about 8% $CO_2$. The particles are then prefoamed by means of hot air (110° C.) for 1 minute. The prefoamed particles have a density of about 45 g/l. The prefoamed particles are coated with 5.0% Vinnex 2501 from Wacker Chemie and subsequently reimpregnated with $CO_2$ in a pressure vessel at 10 bar for 10 minutes. The reimpregnated particles contain about 3.5% $CO_2$. The reimpregnated particles are metered to an industrial production unit for foamed moulded products, in which fusion of the prefoamed particles takes place, using steam. The results are excellent.

Comparative Example 1

Including a Prefoaming Step, No Coating Step

A particulate polylactic acid is prepared as described in Example 1. The particulate polylactic acid is subsequently prefoamed as described in Example 1. No coating is applied, however.

The prefoamed particulate polylactic acid is then reimpregnated with a blowing agent, viz. $CO_2$, by treatment in a pressure vessel at 20 bar for 20 minutes. The reimpregnated particulate polylactic acid contains about 7 wt. % $CO_2$.

Subsequently, the reimpregnated particulate polylactic acid is supplied to an industrial production unit for foamed moulded products, in which further expansion and fusion of the prefoamed particulate polylactic acid takes place so as to obtain a foamed moulded product having a density of 60 g/l.

The fusion of the particulate polylactic acid as well as the mechanical strength of the obtained moulded product are evaluated, the results are shown in Table 1.

Comparative Example 2

No Prefoaming Step, No Coating Step

A particulate polylactic acid is prepared as described in Example 2. No coating is applied, however.

The prefoamed particulate polylactic acid is then impregnated with a blowing agent, viz. $CO_2$, by treatment in a pressure vessel at 20 bar for 20 minutes. The particulate polylactic acid contains about 7 wt. % $CO_2$.

Subsequently, the impregnated particulate polylactic acid is supplied to an industrial production unit for foamed moulded products, in which further expansion and fusion of the prefoamed particulate polylactic acid takes place so as to obtain a foamed moulded product having a density of 60 g/l.

The fusion of the particulate polylactic acid as well as the mechanical strength of the obtained moulded product are evaluated, the results are shown in Table 1.

The fusion between individual particles of the polylactic acid is determined as follows. A foamed moulded product is manually broken in two and the degree of resistance during said breaking is qualitatively determined.

The mechanical properties are determined as compression strength and breaking strength.

The compression strength of the final moulded product was determined in accordance with European Standard (EN) 826 (1969).

The breaking strength of the final moulded product was determined in accordance with European Standard (EN) 12089 (1998).

Shape stability of the nominal dimension of the mould is determined and the moulded product that is ultimately obtained is compared therewith so as to assess whether any shrinkage has occurred.

TABLE 1

| Example | Fusion | compression strength | breaking strength | shape stability |
|---|---|---|---|---|
| 1 | ++ | ++ | ++ | no shrinkage |
| 2 | + | + | + | slight shrinkage |
| 4 | + | + | + | slight shrinkage |
| 5 | + | + | + | slight shrinkage |
| Comparative 1 | − | − | − | disintegrates |
| Comparative 2 | −− | −− | −− | disintegrates |

Evaluation criteria:
++: evaluated as good
+: evaluated as good/sufficient
−: evaluated as sufficient/insufficient
−−: evaluated as insufficient The results of Table 1 show that the particulate polylactic acid according to the present invention exhibits improved results as regards fusion and mechanical properties in comparison with the prior art polylactic acid by the use of a coating. It is apparent, therefore, that one or more of the objects of the present invention are accomplished by the present invention.

It is furthermore apparent that it is preferable to use a prefoaming step.

TABLE 2

| Type of coating | Fusion score |
|---|---|
| polyvinyl acetate (Vinnex 2501) | 10 |
| polyvinyl acetate (Vinnex 2504) | 9 |
| polyvinyl acetate (Vinnex 2510) | 9 |
| polyvinyl acetate (Vinnex 2502) | 9 |
| carboxymethyl cellulose including sorbitol | 4 |
| gelatin | 6 |
| gelatin including sorbitol | 6 |
| casein | 8 |
| casein including glycerol | 9 |
| polyvinyl alcohol type 3-98 | 7 |
| polyvinyl alcohol type 3-88 | 7 |
| polyvinyl alcohol type 3-98 + glycerol | 7 |
| ethyl cellulose | 9 |
| ethyl cellulose + glycerol | 9 |
| polycaprolactone | 9 |
| amorphous polylactic acid | 9 |
| no coating | 3 |

The above table shows that the addition of sorbitol or glycerol as a plasticiser does not affect the fusion. Furthermore it appears that the following coatings are to be preferred: polyvinyl acetate, casein, ethyl cellulose, polycaprolactone and amorphous polylactic acid.

Further preferred embodiments are defined in the claims.

The invention claimed is:

1. A particulate expandable polylactic acid, wherein said particulate polylactic acid is provided with a coating selected from the group consisting of polyvinyl acetate, polyvinyl acetate-based polymer, casein, ethyl celluose, polycaprolactone, amorphous polylactic acid, and one or more combinations thereof.

2. The particulate polylactic acid according to claim 1, wherein the coating is present in an amount of between 0.5 wt. % and 15 wt. %, based on the weight of the particulate polylactic acid.

3. The particulate polylactic acid according to claim 1, wherein the coating further comprises a plasticizer selected from the group consisting of glycerol, sorbitol and urea and one or more combinations thereof.

4. The particulate polylactic acid according to claim 1 wherein the polylactic acid is selected from the group consisting of semi-crystalline polylactic acid, amorphous polylactic acid and a mixture thereof, and from mixtures of polylactic acid and one or more other biodegradable polymers.

5. The particulate polylactic acid according to claim 1 wherein the polylactic acid comprises a chain extender, selected from the group consisting of polyepoxides and diepoxides, diisocyantates, oxazines and oxazolines, cyclic dianhydrides, organic peroxides and one or more combinations thereof.

6. The particulate polylactic acid according to claim 1 wherein the polylactic acid also comprises a nucleating agent, selected from the group consisting of a polyolefin wax, a stereoisomer of polylactic acid, talcum, nano clay or one or more combinations thereof.

7. The particulate polylactic acid according to claim 1 wherein the particle size of the particulate polylactic acid ranges between 0.5 mm and 5 mm.

8. The particulate polylactic acid according to claim 1 wherein the bulk density (tapped) of said particulate polylactic acid ranges between 700 g/l and 1000 g/l.

9. The particulate polylactic acid according to claim 1 wherein said particulate polylactic acid has a density that ranges between 10 g/l and 100 g/l.

10. A method for producing a particulate expandable polylactic acid of claim 1, comprising the steps of a) providing a polylactic acid; b) forming the polylactic acid obtained in step a) into particles; c) coating the particulate polylactic acid obtained in step b) with a coating selected from polyvinyl acetate, polyvinyl acetate-based polymer, casein, ethyl celluose, polycaprolactone, amorphous polylactic acid, or a combination thereof; and d) impregnating the coated particulate polylactic acid obtained in step c) with a blowing agent to obtain a particulate, expandable polylactic acid.

11. The method according to claim 10, wherein step b) comprises two substeps: b1) forming the polylactic acid obtained in step a) into expandable particles; b2) prefoaming the particulate expandable polylactic acid obtained in step b1) to a density of 10-100 g/l to obtain prefoamed particulate polylactic acid; and wherein step c) comprises the coating of the prefoamed particulate polylactic acid obtained in step b2).

12. The method for producing a foamed molded product which comprises the steps of: i) providing particulate expandable polylactic acid according to claim 10; ii) bringing the particulate expandable polylactic acid in step i) under temperature and pressure conditions so that a foamed molded product is obtained.

13. The method according to claim 12, wherein the particulate polylactic acid obtained in step i) is contacted with air or steam having a temperature of 60-160° C. in step ii).

14. The method according to claim 12 wherein a pressure of 0.1-2.0 bar is used in step ii).

15. A foamed molded product obtained by the method according to claim 10.

16. The foamed molded product according to claim 15, wherein said product has a density between 10 g/l and 100 g/l.

17. The particulate polylactic acid according to claim 2, wherein the coating is present in an amount of between 2 wt. % and 10 wt. %, based on the weight of the particulate polylactic acid.

18. The particulate polylactic acid according to claim 1 wherein said coating is biodegradable.

19. The particulate polylactic acid according to claim 1 which further comprises a lubricant comprising zinc stearate.

20. The particulate polylactic acid according to claim 7 wherein the particle size of the particulate polylactic acid ranges between 0.5 mm and 1.5 mm.

* * * * *